(No Model.) 2 Sheets—Sheet 1.
W. D. GRAY & H. C. HOLTHOFF.
KEY FOR CONNECTING SHAFTS TO OTHER PARTS.
No. 550,019. Patented Nov. 19, 1895.
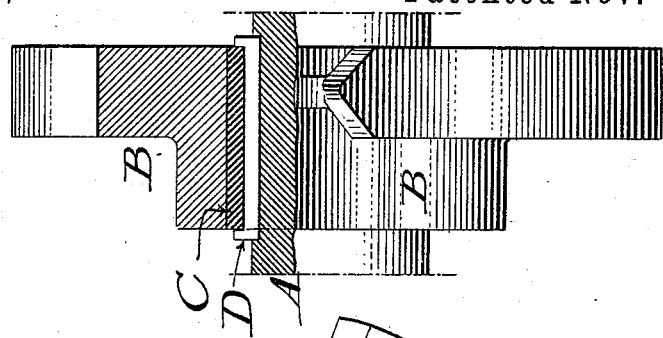
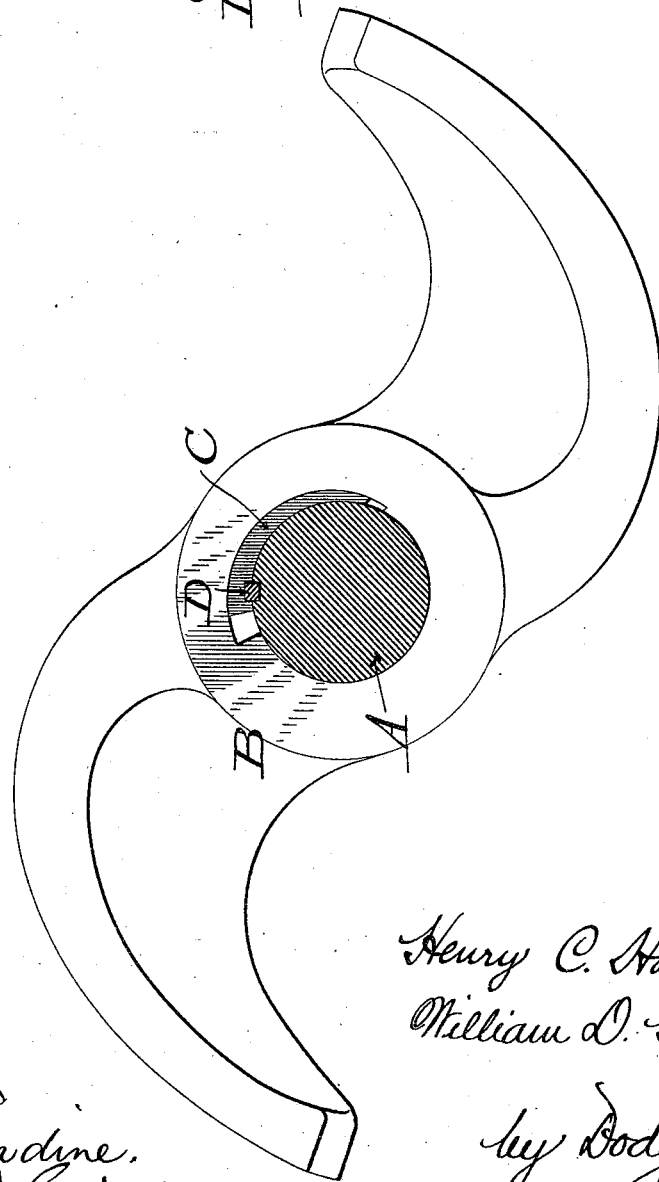
Witnesses
Ceb. Burdine.
Rob't L. Miller
Henry C. Holthoff
William D. Gray
Inventors
by Dodge & Sons,
Attorneys.

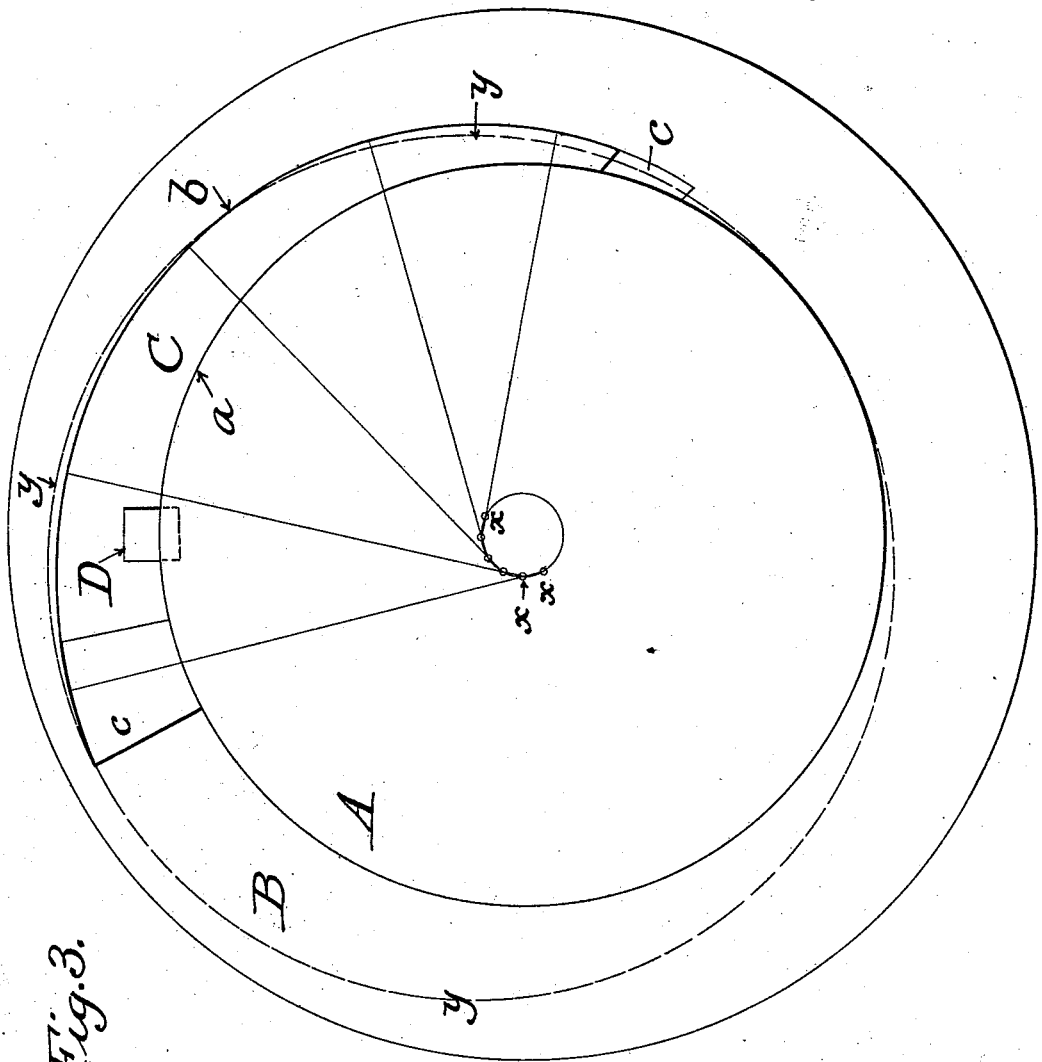

UNITED STATES PATENT OFFICE.

WILLIAM D. GRAY AND HENRY C. HOLTHOFF, OF MILWAUKEE, WISCONSIN.

KEY FOR CONNECTING SHAFTS TO OTHER PARTS.

SPECIFICATION forming part of Letters Patent No. 550,019, dated November 19, 1895.

Application filed August 16, 1895. Serial No. 559,508. (No model.)

*To all whom it may concern:*

Be it known that we, WILLIAM D. GRAY and HENRY C. HOLTHOFF, citizens of the United States, residing at Milwaukee, in the county of Milwaukee and State of Wisconsin, have invented certain new and useful Improvements in Keys for Connecting Shafts to other Parts, of which the following is a specification.

Our invention relates to a novel construction of a key for connecting a shaft to a cam or other part or element; and it consists in the combination, with a shaft and a part or element to be connected therewith, of a tapering or wedge-shaped key whose back describes or is described by an involute curve and connected rigidly with the shaft and fitted to a socket whose face describes or is described by a corresponding involute curve in the part or element to be connected with the shaft.

In ore-stamps and similar machinery where there is a series of heavy sudden blows, with the accompanying jars or concussions, difficulty has been experienced in making a firm and lasting connection between the shaft and the cam. Ordinary keys and set-screws have been employed; but they soon become loose and frequently break. To overcome this difficulty it has been proposed to lap about the shaft tapering wedges or keys curved on the arc of a circle eccentric to the shaft; but these are objectionable for the reason that after wear has begun and the key or wedge is moved to its slightest degree from its original position in its seat or socket, as will inevitably occur, the key or wedge will no longer bear throughout its entire length against the wall of the socket, but will bear or touch only at its heel or point, according to the direction in which the hub has been turned. This is due to the fact that the outer face of the wedge is formed on the arc of a circle, and being struck from one center it will be carried farther away from the center of the shaft at the heel or the point as the shaft is turned, and consequently by bearing at the heel or the point, as the case may be, it is prevented from bearing throughout its entire length in its seat. Consequently the so-called "circular" or "eccentric" wedge or key possesses little or no advantage over the ordinary spline or feather.

To produce a connection which shall remain tight at all times—that is, one that shall take up the wear or play due to the movement of the hub upon the shaft—we lap about and secure rigidly to the shaft a curved wedge or key whose back or outer face or periphery describes or is described by an involute curve, and we form in the hub part or element to be connected to the shaft a seat or socket whose face describes or is described by a corresponding involute curve. As a result of this construction, it will be seen that the back of the wedge or key and the face of the seat or socket remain parallel with each other through any movement of the hub upon the shaft, and that consequently the wedge will bear throughout its length against the face of the seat or socket, no matter in which direction the hub be turned. The involute curve is formed of a series of arcs described from a series of centers on a circle concentric with the shaft, and hence when the shaft turns the involute wedge rolls, in a sense, about the center of the shaft, thereby maintaining its parallelism with the face of the involute seat and insuring seating or contact throughout the entire length of the wedge.

In the drawings, Figure 1 is a transverse sectional view through the cam-shaft of an ore-stamp, showing our invention applied thereto; Fig. 2, a longitudinal sectional view of the same, and Fig. 3 a diagrammatic view.

A indicates the shaft; B, the part or member to be connected thereto; C, the wedge, and D the retaining-key for the wedge.

The wedge C has an inner face $a$, conforming to the shaft, and a back or outer face $b$, which describes or is described by an involute curve, as shown in Fig. 3. The centers from which the various arcs forming the involute curve are struck are indicated by the small circles $x$. On the same figure a dotted line $y$ is shown, which illustrates the form the eccentric wedge before referred to would take, and also the difference in form between such wedge and the involute wedge of the present invention.

In the hub or part B there is found a seat or recess c, of greater length than the key, and whose face or wall describes or is described by an involute curve corresponding to that of the wedge.

The wedge is slotted transversely on its inner face, and the shaft slotted longitudinally to receive the key D, which latter, as shown, has a head or enlargement at each end. The key and the wedge are placed in position upon the shaft, and the cam is then moved lengthwise of the shaft into proper position over the wedge.

Instead of making the wedge and its retaining-key separate from the shaft, they may be made integral therewith.

Having thus fully described our invention, what we claim is—

In combination with a shaft having thereon a wedge whose back face describes or is described by an involute curve; a part or member encircling the shaft and wedge and having a seat or socket whose face is curved to correspond with the back of the wedge.

In witness whereof we hereunto set our hands in the presence of two witnesses.

WILLIAM D. GRAY.
HENRY C. HOLTHOFF.

Witnesses:
JNO. DRISCOLL, Jr.,
WM. BANNEN.